United States Patent [19]

Urata et al.

[11] Patent Number: 4,765,960
[45] Date of Patent: Aug. 23, 1988

[54] APPARATUS FOR INSTALLING PIPE IN MULTIPIPE TYPE GAS-LIQUID CONTACT EQUIPMENT

[75] Inventors: Toshiaki Urata, Isehara; Minato Tomikawa, Yokohama, both of Japan

[73] Assignee: Chiyoda Chemical Engineering & Construction Co., Ltd., Yokohama, Japan

[21] Appl. No.: 738,314

[22] Filed: May 28, 1985

[30] Foreign Application Priority Data

Jun. 5, 1984 [JP] Japan .................................. 59-113938

[51] Int. Cl.4 .............................................. B01T 8/00
[52] U.S. Cl. ..................................... 422/49; 285/161; 285/206; 422/310
[58] Field of Search ................ 422/49, 176, 196, 197, 422/220, 312, 310; 165/172, 177, 178; 285/161, 205–210

[56] References Cited

U.S. PATENT DOCUMENTS

| 151,402 | 5/1874 | Kilgore | 285/206 |
|---|---|---|---|
| 671,763 | 4/1901 | Greenfield | 285/206 |
| 913,265 | 7/1907 | Coppage | 285/206 |
| 1,556,058 | 10/1925 | White | 285/206 |
| 1,860,800 | 5/1932 | Borden | 285/206 |
| 1,987,903 | 1/1935 | Houdry | 422/49 |
| 2,090,380 | 8/1937 | Terry | 285/161 |
| 2,108,076 | 2/1938 | Prickett | 285/206 |
| 2,117,111 | 5/1938 | Bills | 285/206 |
| 2,277,885 | 3/1942 | Rodanet | 285/206 |
| 2,580,818 | 1/1952 | Mundy et al. | 255/206 |
| 2,835,305 | 5/1958 | Boyer | 285/206 |
| 3,104,120 | 9/1963 | Myers | 285/206 |
| 3,321,068 | 5/1967 | Beach | 422/300 |
| 3,332,433 | 7/1967 | Edmondson | 285/161 |
| 3,401,958 | 9/1968 | Demyon | 285/161 |
| 3,980,440 | 9/1976 | Morse et al. | 422/211 |
| 4,312,558 | 1/1982 | Duerr et al. | 285/161 |

*Primary Examiner*—Barry S. Richman
*Assistant Examiner*—William R. Johnson
*Attorney, Agent, or Firm*—Armstrong, Nikaido, Marmelstein & Kubovcik

[57] ABSTRACT

Apparatus for installing pipes in multipipe type gas-liquid contact equipment comprises a bush which can be mounted on the inner peripheral surface of a pipe installation bore formed in a deck for pipe installation within the multipipe type gas-liquid contact equipment, a cylindrical head which is provided on the upper end of the pipe, the head being capable of penetrating in conjunction with the pipe through the bush, and a collar member which can be fitted to the outer peripheral surface of the cylindrical head. In this apparatus, the collar member is fitted to the cylindrical head, and the installation of pipes is performed by rotating the collar member.

7 Claims, 4 Drawing Sheets

FIG.5(a)
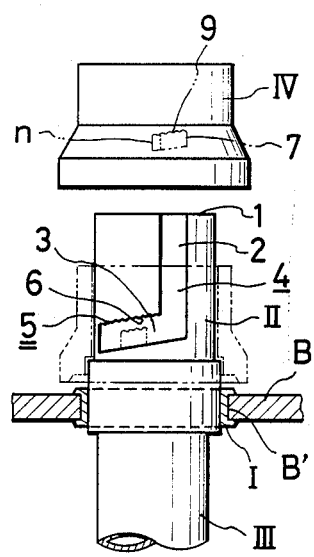
FIG.5(b)
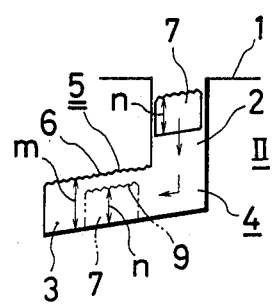
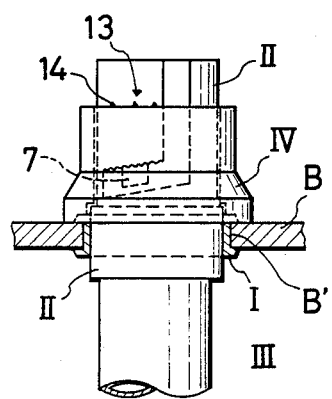
FIG.6(a)
FIG.6(b)
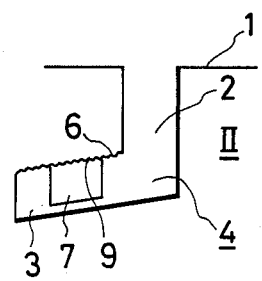

a gas to be treated is supplied through a gas introduction pipe a into a gas distribution chamber b and is then blown into the liquid within the gas-liquid contact equipment A through pipes d.

APPARATUS FOR INSTALLING PIPE IN MULTIPIPE TYPE GAS-LIQUID CONTACT EQUIPMENT

BACKGROUND OF THE INVENTION

The present invention relates to an apparatus for advantageously installing pipes in a multipipe type gas-liquid contact equipment.

In a conventional multipipe type gas-liquid contact equipment, for instance, one for eliminating sulfur dioxide from the exhaust gas which has been discharged from a large combustion furnace, as shown in FIG. 1, a gas to be treated is supplied through a gas introduction pipe a into a gas distribution chamber b and is then blown into the liquid within the gas-liquid contact equipment A through pipes d.

A large amount of gas is treated in the above-described equipment A; hence, it is necessary for it to be large enough so that the gas-liquid contact equipment A exceeds 10 m in diameter and the pipes number more than 2,000. It is therefore impossible to manufacture a deck B for installing pipes d such that the deck B is a perfect plane. Hence, the deck B partially has, as indicated by the dotted line in FIG. 1, elevated portions and depressions, irregularities which are due to manufacturing errors.

Since, in the conventional method, the pipes d which have been cut to a predetermined length are installed to the deck B by welding or bonding, the lower ends of the pipes d are not all aligned on the same horizontal plane. Inevitably, in regard to the lower ends of the pipes d, irregularities are also created which conform with those of the deck B as indicated by the dotted line in FIG. 1.

As a result, the height hn, that is, the distance from the liquid surface e to the lower end f of each of the pipes d is not uniform. Consequently, the height hn of some pipe d is higher or lower than others. When comparing a pipe d having a smaller height ($h_1$) with another which has a greater height ($h_2$), the pipe d of the smaller height has a lower pressure resulting from the column of liquid at its outlet of gas (for instance, the lower end f of the pipe d); conversely, the pipe d of the greater height has a higher pressure. Accordingly, much of the gas to be treated is blown into the liquid from a pipe d of the smaller height ($h_1$) which exhibits a lower pressure and the pipe d of the greater height ($h_2$) has a less of the gas blown into.

Since the size of a gas-liquid contact region corresponds to the depth of the outlet of the pipe d which is immersed in the liquid, it is necessary that the lower ends f of the pipes d should be maintained on a same horizontal plane in order to obtain the predetermined results.

To satisfy this condition, it is a matter of course that the deck B should be manufactured such as to have a plane which is as close to horizontal as possible. Furthermore, when the pipes d are installed to the deck B, the lower ends f of the pipes d should be adjusted such as to be aligned on the same horizontal plane in accordance with the irregularities of the deck B. However, once the pipes d are installed to the deck B by welding or bonding, it is almost impossible thereafter to adjust the fitting locations. Moreover, as the number of pipes increases, it is more difficult to adjust the pipes d which are installed to the deck B by welding or bonding.

SUMMARY OF THE INVENTION

Accordingly, it is a primary object of the present invention to provide an apparatus for installing pipes in a multipipe type gas-liquid contact equipment which obviates the above-mentioned defects of the prior art and enables easy installation of pipes and further enables related adjustments to be made by an extremely simple operation, whereby errors in relation to the manufacture of the deck can to some extent be allowed.

To this end, the present invention provides an apparatus for installing pipes in multipipe type gas-liquid contact equipment, comprising: (1) a bush which can be mounted on the inner peripheral surface of a pipe installation bore which is formed in a deck for pipe installation within multipipe type gas-liquid contact equipment; (2) a cylindrical head which is provided on the upper end of the pipe, the head being capable of penetrating in conjunction with the pipe through the bush; and (3) a collar member which can be fitted on the outer peripheral surface of the cylindrical head, wherein the cylindrical head has an engagement groove provided on its outer peripheral surface, which engagement groove includes a longitudinal groove extending downward from the upper end of the cylindrical head and a lateral groove extending horizontally, and being communicated with the longitudinal groove and made inclined with respect to the bottom surface of the collar member, and wherein the collar member has a projection formed on the inner peripheral surface thereof, the projection being capable of moving through the engagement groove.

The above and other objects of the present invention will be clarified from the following description.

BRIEF DESCRIPTION OF THE DRAWINGS

FIG. 5(A) is a view which illustrates the assembling steps of the installation apparatus shown in FIG. 2;

FIG. 5(B) is a view which illustrates the positional relationship between an engagement groove of a cylindrical head and a projection of a collar member in the course of assembling the apparatus;

FIG. 6(A) is a vertical view of the installation apparatus after the pipe has been installed to the deck;

FIG. 6(B) is a view showing the positional relationship between the engagement groove of the cylindrical head and the projection of the collar member when the operation of installing the pipe to the deck has been completed;

DESCRIPTION OF THE PREFERRED EMBODIMENTS

The arrangement of the apparatus for installing pipes in multipipe type gas-liquid contact equipment according to the present invention will now be described in detail hereinafter on the basis of one embodiment shown in the accompanying drawings.

Figure 1:
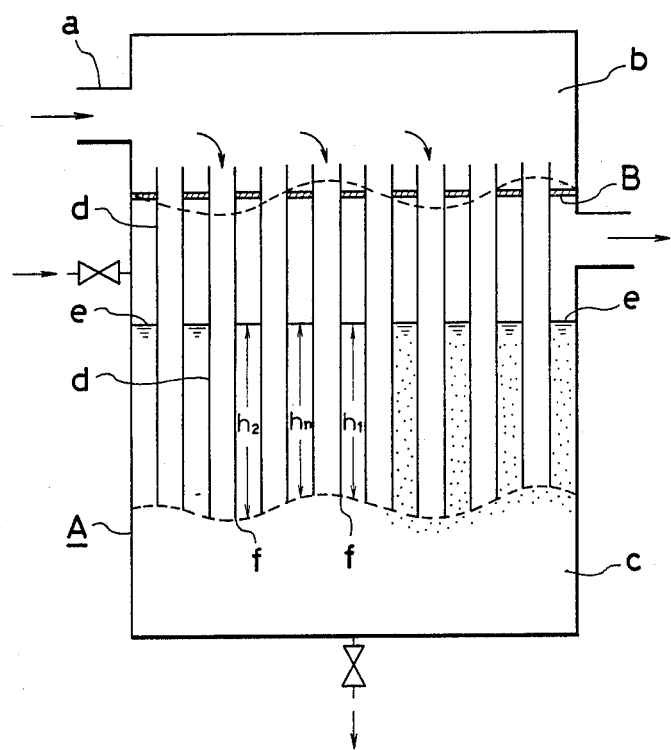
FIG. 1 is a vertical sectional view of one example of a conventionally known multipipe type gas-liquid contact equipment.
Figure 2:
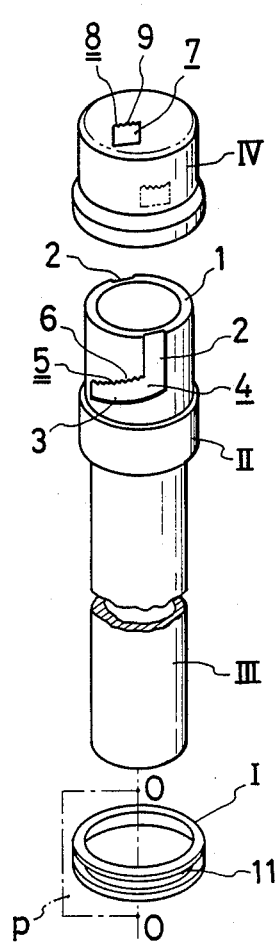
FIG. 2 is an exploded perspective view of one embodiment of an apparatus for installing pipes in the multipipe type gas-liquid contact equipment according to the present invention.
Figure 3:
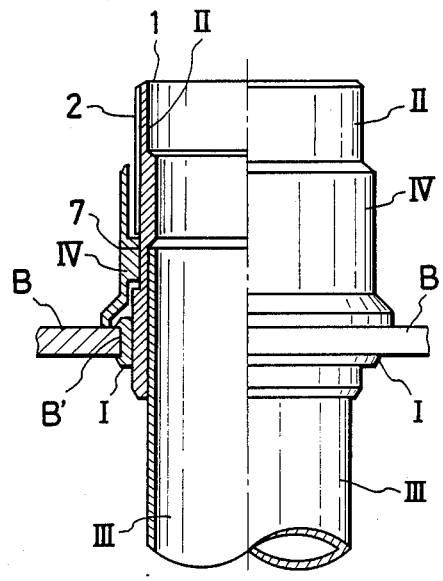
FIG. 3 is a vertical sectional view of the apparatus shown in FIG. 2 in the assembled state.

In FIG. 2, the reference Roman numeral I represents a bush, which is, as shown in FIG. 3, reliably fitted to the inner peripheral surface of a pipe installation bore B' which is formed in a deck B for pipe installation.

A cylindrical head II is provided on the upper end of a pipe III, which head II is capable of penetrating in conjunction with the pipe III through the bush I. With respect to the cylindrical head II, an engagement groove 4 is provided on the outer peripheral surface thereof, which groove 4 includes a longitudinal groove 2 extending from the upper end (hereafter referred to as a "butt end" 1) to its lower part, that is, in the general direction (direction parallel to the axis of the pipe III) and includes a lateral groove 3 extending horizontally, being communicated with the longitudinal groove and being made inclined with respect to the bottom surface of a collar member. The lateral groove 3 may be a spiral groove. The upper inner wall of the lateral groove 3, that is, the groove wall 5 of the lateral groove 3 which is close to the butt end 1, forms an engagement portion 6.

IV indicates a collar member which is capable of fitting on the outer peripheral surface of the cylindrical head II. The collar member IV has a projection 7 which is formed on its inner peripheral surface. The projection 7 is capable of moving through the engagement groove 4 of the cylindrical head II. The projection 7 has, as shown in FIG. 5(B), a height n smaller than the width m of the lateral groove 3 of the cylindrical head II. Further, an engagement portion 9, which is capable of engaging the engagement portion 6 of the cylindrical head II, is provided on an upper side wall 8 of the projection 7.

The apparatus for pipe installation according to the present invention essentially consists of the above-mentioned bush I, the cylindrical head II and the collar member IV.

Figure 4:
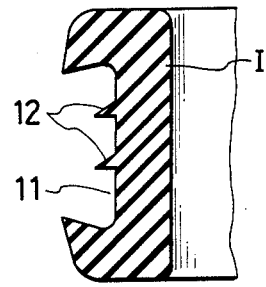
FIG. 4 is a vertical sectional view of the bush shown in FIG. 2 taken through the plane which includes the central line O—O thereof.

Provided the arrangement is such that the bush I favorably has, as shown in FIG. 4, an annular groove 11 by which it is possible for the inner periphery of a pipe installation bore B' of the deck B to engage with the outer periphery of the bush I, and an annular projection 12 is formed within the annular groove 11, it becomes practicable for the deck B to be reliably engaged with the bush I, even though there may be some manufacturing errors in diameter of the pipe installation bore B' of the deck B and further some irregularities on the inner peripheral surface of the installation bore B'. Moreover, the inside diameter of the bush I is set such as to be slightly smaller than the outside diameter of the cylindrical head II, which arrangement causes the cylindrical head II to stretch the bush I outwardly, whereby it is feasible to obtain reliable sealing between the bush I and the cylindrical head II and further between the bush I and the pipe installation bore B' of the deck B.

For example, rubber having elasticity is sufficient to serve as a material for the bush I. Other suitable materials may also be used by taking into consideration the shape and other elements of the bush I in their selection. In regard to the shape of the engagement portions 6 and 9, permissible shapes include a saw-toothed or other angularly toothed shape, or wavy shape or the like, all of which are suitable for the engagement needed. Plural engagement grooves 4 and projections 7 may be employed.

This embodiment has the above-described arrangement. Therefore, in order to install the pipe III to the deck B for pipe installation, the bush I is first fitted in the pipe installation bore B' of the deck B as shown in FIG. 5(A). The pipe III is inserted into the bore of the bush I from the upper side or the lower side of the deck B in such a manner that the cylindrical head II is directed upward. The cylindrical head II is then placed such that the outer peripheral surface of the lower part thereof is set in the bore of the bush I. Thereafter, the collar member IV is put on the cylindrical head II from above and the projection 7 provided on the inside wall of the collar member IV is inserted into the longitudinal groove 2 of the cylindrical head II from the butt-end 1 of the cylindrical head II. The collar member IV is, as shown in FIG. 5(B), rotated such that the projection 7 slides on the groove edge of the lower side of the lateral groove 3 of the engagement groove 4. Just at the point where the collar member IV has been rotated to a desired angle, the cylindrical head II is, in conjunction with the pipe III, pushed down. With this step, the engagement portion 6 of the lateral groove 3 of the cylindrical head II, as shown in FIG. 6(B), engages the engagement portion 9 of the projection 7 of the collar member IV, whereby the pipe III is fixed to the deck B as shown in FIG. 6(A).

Figure 7:
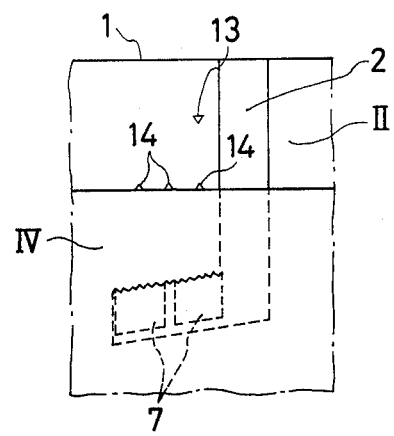
FIG. 7 is a view which illustrates the relationship between graduation marks of the collar member and the index of the cylindrical head.

It is desirable to have an arrangement such that the lateral groove 3 of the cylindrical head II is made spiral, this groove 3 also being made inclined with respect to the bottom surface of the collar member IV, as shown in FIG. 6(B). With the thus arranged state, the height of the lower end of the pipe III varies in accordance with any variation in location of the projection 7 with respect to the lateral groove 3; hence, it becomes easy to adjust the height of the lower end of the pipe III. Furthermore, as indicated in FIG. 7, an index 13 is favorably provided on the outer peripheral surface of the cylindrical head II, while at the same time graduation marks 14 are also provided on the outer peripheral surface or the upper edge of the collar member IV, which arrangement makes it possible to engage the cylindrical head II with the collar member IV by varying the degree of rotation of the collar member IV in relation to the cylindrical head II. Therefore, it becomes all the more easy to adjust the height of the lower end of the pipe III in the vertical direction. Namely, when the cylindrical head II engages the collar member IV at a location wherein the index 13 is arranged to correspond to the graduation mark 14 for location of a small rotation rate of the collar member IV, the engagement portion 6 of the cylindrical head II is in a higher location with respect to the bottom surface of the collar member IV. Therefore, the distance between the lower end of the pipe III and the deck B increases. When the graduation mark 14 for location of a large rotation rate of the collar member IV is arranged to correspond to the index 13, the engagement portion 6 is positioned lower than that of the previous case. The distance between the lower end of the pipe III and the deck B is therefore decreased as compared with the former case. It is thus practicable to easily adjust the height of the lower end of the pipe III in the vertical direction.

Figure 8:
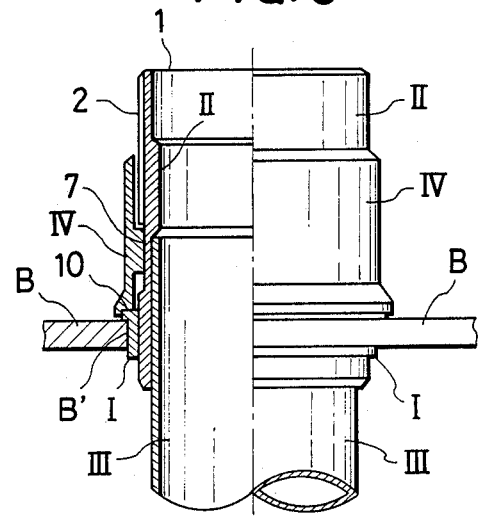
FIG. 8 is a vertical sectional view of the installation apparatus in accordance with another embodiment in a state where it has been assembled.

Moreover, as shown in FIG. 8, a bush holding portion 10 is provided at the lower end of the collar member IV, and an arrangement is advantageously made such that the entire weight of the cylindrical head II which engages the collar member IV and of the pipe III which is joined to the cylindrical head II is applied to the bush I through the bush holding portion 10. Accordingly, the bush I is pressed and put into the space between the inner peripheral surface of the pipe installation bore B' of the deck B and the outer peripheral surface of the cylindrical head II, thereby further increasing the reliability of the seal of the bush I.

In this embodiment, it is permissible for the cross-sectional figure of the bush I to become, as shown in FIG. 8, an L-shape, while a V-shape cross-sectional figure may also be effectively employed. Further, the arrangement may be made in such a manner that the pipe installation bore B' does not take a cylindrical shape but is a section of a cone where the inside diameter of the bore B' decreases as it goes toward the lower side of the deck B and the bore B' is employed in combination with a bush I of the above-described shapes (for instance, the L-shape), whereby it is feasible to constantly maintain reliable seal of the bush I by the effect of the weight of the pipe III, etc., during long-term use.

The apparatus for installing the pipes being constituted as above described according to the present invention, the following effects can be enjoyed.

(a) Welding or bonding is not necessary; hence, it is extremely easy to install the pipe to the deck, which fact makes it possible to manufacture multipipe type gas-liquid contact equipment in an extremely economical manner within a remarkably short period of time. This effect becomes more pronounced as the size of the equipment becomes larger.

(b) Since it is easy to vertically adjust the installation height of the pipe from the deck, a greater allowance for errors is permissible in manufacturing the deck than was possible in the prior art and it is possible to obtain a constantly favorable gas-liquid contact efficiency.

(c) With the above-described simplified arrangement, there is no necessity for special techniques to be employed in installing and removing the pipe. Accordingly, the need for labour in maintenance as well as in the manufacturing process is reduced and long-term stability of operation is facilitated.

(d) Each of the constitutive members has a simple structure, so that mass-production can be effected which fact is economically beneficial as well.

(e) It is practicable to install, adjust, and remove the pipe and carry out ancillary work from the lower side of the deck and hence determination as to the amount of space required on the upper side of the deck can be made regardless of the length of the pipe III, whereby it is possible to reduce the size of gas-liquid contact equipment.

What is claimed is:

1. An apparatus for installing a pipe in a pipe installation bore formed in a deck provided for pipe installation in multiple type gas-liquid contact equipment, comprising: a bush which can be mounted on an inner peripheral surface of a pipe installation bore; a cylindrical head to be provided on an upper end of a pipe, said head being capable of penetrating in conjunction with the pipe through said bush; and a collar member which can be fitted on an outer peripheral surface of said cylindrical head; wherein said cylindrical head has an engagement groove which is provided on the outer peripheral surface thereof, said engagement groove including a longitudinal groove which extends downwardly from an upper end of said cylindrical head and a lateral groove which extends horizontally, said lateral groove communicating with said longitudinal groove and being inclined with respect to a bottom surface of said collar member, and wherein said collar member has a projection which is formed on the inner peripheral surface thereof and cooperated with said engagement groove to permit adjusting and fixing of the length portion of the pipe below a deck, said lateral groove having first engaging means capable of engaging with second engaging means provided on said projection to prevent relative movement therebetween and said projection being capable of moving in said lateral groove of the engagement groove to adjust the length portion of the pipe below the deck and of engaging with said engagement groove such that said first engaging means and said second engaging means are brought into engagement with each other to fix the positioning of the pipe relative to the deck.

2. An apparatus for installing a pipe in a multipipe type gas-liquid contact equipment according to claim 1, wherein said bush has an annular groove defined on its outer peripheral surface, said annular groove being capable of being engaged with the inner periphery of the deck, and wherein an annular projection is defined on said bush within said annular groove.

3. An apparatus for installing a pipe in multipipe type gas-liquid contact equipment according to claim 1, wherein the inside diameter of said bush is slightly smaller than the outside diameter of said cylindrical head.

4. An apparatus for installing a pipe in multipipe type gas-liquid contact equipment according to claim 1, wherein the cross-sectional shape of said bush is an L-shape or a V-shape.

5. An apparatus for installing a pipe in multipipe type gas-liquid contact equipment according to claim 1, wherein said lateral groove of said cylindrical head is spiral shaped, said lateral groove being inclined with respect to the bottom surface of said collar member.

6. An apparatus for installing a pipe in a multipipe type gas-liquid contact equipment according to claim 1, wherein an index means is provided on the outer peripheral surface of said cylindrical head, and graduation marks are defined on either of the outer peripheral surface of said cylindrical head or the upper edge of said collar member.

7. An apparatus for installing a pipe in multipipe type gas-liquid contact equipment according to claim 1, wherein a bush holding means is provided at the lower end of said collar member which is arranged such that the entire weight of said cylindrical head being engaged with said collar member and of the pipe being joined to said cylindrical head is applied to said bush through said bush holding portion.

* * * * *